Patented June 9, 1953

2,641,531

UNITED STATES PATENT OFFICE 2,641,531

PREPARATION OF PERICLASE

Leslie W. Austin, San Jose, and Clarence A. Rick, Menlo Park, Calif., assignors to Kaiser Aluminum & Chemical Corporation, a corporation of Delaware No Drawing. Application November 8, 1949, Serial No. 126,247

21 Claims. (Cl. 23—201)

This invention relates to a method of forming crystalline magnesium oxide material of high purity and of high density, with decreased effective surface, with the aid of small amounts of at least two added components which enable crystallization to take place at lower temperatures; and which likewise enable production of crystal aggregates of improved refractory qualities; and it further relates to the crystalline material and crystal aggregates so produced.

Magnesium oxide in the pure state has been very difficult to prepare in crystalline form, heating to temperatures in excess of 2000° C. commonly being required for acceptable crystallization of even the technically pure grade. Even when fired as high as about 2200° C. the best non-fused product commercially available today has an apparent porosity of about 11% as measured by mercury displacement. Since such temperatures are very difficult to attain in fuel-fired furnaces, and since such porosity is higher than is acceptable for many purposes, crystalline magnesia of purity better than about 95% MgO is ordinarily prepared by fusion in electric furnaces. Such fusion is a difficult process and yields an expensive product which is relatively inert and unsatisfactory for some purposes. For example, it is very difficult to bond toegther to form high temperature ceramic articles.

In order to allow crystallization of the magnesia to take place at lower temperatures, such as those attainable in a rotary kiln, e. g., 1800° C. or less, it has been the practice to employ an admixture of from 5 to 15 percent of impurities such as silica, lime, alumina, and iron oxide along with the magnesia. These impurities flux with the magnesia, allowing sintering and crystallization to take place at temperatures within the range from about 1550° C. to 1800° C. depending upon the amount and kind of additives. Even with the larger amounts of impurities, the highest temperatures are required to produce a material having practically negligible residual shrinkage, i. e., under about 5% porosity.

Although useful in allowing the burning of the magnesia to be done at lower temperatures, the presence of the large amounts of impurities in the magnesia is objectionable for many purposes, as for example where danger exists of chemical contamination. When the crystalline magnesia material is to be used for ceramic or refractory purposes, the impurities markedly reduce the over-all refractoriness of the material, and even more markedly lower its ability to bear load at high temperatures and its resistance to thermal spalling and to corrosion by acidic materials.

It is an object of this invention to provide a method of forming crystallized magnesia, or periclase, of increased density and decreased effective surface; and to attain this result without fusion of the material and without addition of fluxes thereto. It is a further object to provide a method of forming magnesia refractory grain of improved characteristics, particularly with regard to hardness or toughness of the grain and to its lower porosity. It is a further object to provide magnesia refractory grain material of such improved characteristics.

It has now been discovered that magnesia refractory grains improved with respect to hardness or toughness and resistance to abrasion and with respect to lower porosity, are made by admixing magnesia-yielding material or incompletely crystallized, or cryptocrystalline magnesia with a small amount of a chromium material and a small amount of at least one substance chosen from the group consisting of compounds of copper, beryllium, zinc, aluminum, lead, nickel, zirconium, vanadium, manganese and cobalt. The total amount of chrome material and second material or materials added is to provide up to 2.0%, calculated as the respective oxides, based upon the total weight of the fired product. Preferably, there is incorporated a total amount of the additive so calculated, of from about $\frac{1}{16}$% of each to about 2% total. Usually, the best crystallization and greater improvement in the desired characteristics is found in the lower ranges of added amounts.

The periclase-yielding starting material is a compound of magnesium which will form magnesia, magnesium oxide, upon calcining; and which will yield periclase upon firing. Such a compound can be magnesite, brucite or other suitable natural magnesia ore, or magnesium carbonate, magnesium basic carbonate, magnesium hydroxide, magnesium acetate, magnesium alcoholate and the like. Another suitable starting material is cryptocrystalline, or incompletely crystallized magnesia, such as, for example, that generally called "active" magnesia. Hydrated magnesia is also improved by the present process. The invention is particularly effective with high purity starting materials, which are ordinarily difficult to crystallize satisfactorily, and with such materials in finely divided form. The invention is of special advantage in treating finely divided precipitated magnesium compounds, such as magnesium carbonate or basic carbonate, or magesium hydroxide, as well as finely divided active magnesia. Mixtures of these can be used.

The chromium compounds useful in this invention are preferably added in thorough and intimate admixture with the magnesia-yielding compound. This is advantageously effected by adding the chrome compound in solution. Water is a preferred solvent for the chrome compound but any other solvent therefor can be used. For instance, chromic sulfate in one form is more soluble in alcohol than in water, and in such case alcohol can be employed as the solvent, or liquid dispersing medium. The chromium compounds which can be added in the method of this invention include for example, chromic acid, magnesium chromate and dichromate, ammonium chromate and dichromate, chromium sulfate, chromium chloride, chromium nitrate, the chromates and dichromates of the alkali metals, the chromates and dichromates of the alkaline earth metals, chromium acetate, chromium oxide, chromite, chromium metal, etc.

The materials which are added along with the chromium material which, for convenience, are sometimes termed herein "secondary" additive or crystallizing components, are compounds of metals which are found in spinels, or as forming compounds like spinels, of the chemical formula, $RO.R^1_2O_3$, or refractory multiplie oxides, where R and $R^1$ are metals. Compounds of the indicated elements are useful in this invention, including salts, oxides and other compounds. These crystallizing components must also be added in intimate admixture with the periclase-yielding material to be beneficiated. This can be effected by adding as very finely divided solid material. Preferably, however, such intimate admixture is obtained by adding the component as a solution or suspension in the liquid employed for tempering the mix. Water is a preferred liquid and solvent, but other liquids can be used. For instance, some of the compounds are soluble in acetone or alcohol and such a solution is also useful. Mixtures of the secondary additives, or crystallizing components, can be employed.

The method of the invention comprises intimately admixing finely divided periclase-yielding material, a small amount of chromium material and a small amount of the secondary additive or additives, and firing to form well-crystallized periclase. The materials can be admixed in any sequence. For instance, the primary and secondary crystallizing components can be previously admixed and then added to the periclase-yielding material as desired; or they can all be admixed simultaneously, or in any other desired manner. Especially good results are sometimes obtained when an admixture of cryptocrystalline magnesia-containing material and crystallizing components is pressed and then fired to crystallization equilibrium. Such a cryptocrystalline magnesia-containing material can be made in various ways. It can be prepared by calcining a magnesia-yielding compound as described above to form active magnesia, for instance, to form a magnesia having a bulk density of not more than about 1.5 gms. per cc. when measured on a sample thereof ground in a ball mill to pass 200 mesh, and then admixing the crystallizing components therewith, pressing and firing. Or, it can be prepared by admixing magnesia-yielding material and the crystallizing components, calcining the admixture to an active state, that is, to form cryptocrystalline magnesia containing the other components, and then pressing and firing. In this embodiment of the invention, the crystallizing components may be present in the calcined product as the oxides or they may have entered into combination with the magnesia or with each other, or, possibly, may be at least partly in solid solution in the magnesia. Whatever the state in which they exist, the final periclase obtained is very dense, and suitable for refractory use or other use. Alternatively, part of the total crystallizing additive, or one of the ingredients thereof, can be added to the magnesia-yielding starting material, the admixture calcined to form cryptocrystalline magnesia, and then the remaining ingredient or ingredients or portion thereof admixed with the calcined material, the whole pressed and fired as described. If desired there can be mixed with the cryptocrystalline magnesia-containing material up to 90% of finely divided well-crystallized periclase, and the mass pressed and fired as described.

In calcining to obtain a cryptocrystalline magnesia as described herein, it is preferred to employ a moderate temperature, such as not more than 1200° C., and preferably for not more than one hour. Higher temperatures can be employed, but with shorter times of heating, in order to avoid shrinkage and more complete crystallization of the material. In firing the mixed materials to obtain well-crystallized periclase a temperature of at least 1300° C. is employed. Preferably, the firing temperature is from about 1500° C. to about 1800° C. In other words, the material is fired at a temperature and for a time to effect crystallization equilibrium.

It is an advantage of the present invention that a mixture of the materials as described herein can be fired to crystallization equilibrium at a temperature as much as 400° C. below that required heretofore for firing magnesia of such purity. It is also an advantage that a denser product is obtained as measured in weight per unit volume. Furthermore, larger crystals are obtained than are obtained when the same magnesia is fired without the addition of the crystallizing components described. Crystalline magnesia prepared according to this invention also has very low apparent porosity, and a hard grain can be produced in this manner.

The following examples will illustrate more clearly the process of the invention, and the products which are the subjects thereof.

*Example 1*

Magnesium hydroxide is obtained by treating sweetened seawater with calcined dolomite to precipitate $Mg(OH)_2$, and washing and filtering the precipitate. The filter cake recovered contains, on the ignited basis, 1.25% $SiO_2$, 1.08% CaO, 0.57% $R_2O_3$ and 97.10% MgO (by difference). With a portion of this filter cake are intimately admixed beryllium chloride in an amount to correspond to ⅛% by weight, calculated as BeO, and chromic acid, to correspond to ⅛% by weight, calculated as $Cr_2O_3$. The mixture is dried, pelleted and fired at 1700° C. for one-half hour. The periclase obtained is very hard, exhibits a conchoidal fracture, and has an apparent porosity of 7.9%. Another portion of the same filter cake, treated in exactly the same way except that there is no addition of beryllium compound or chromic acid, gives a brittle, needle grain having an apparent porosity of 14.5%. The addition of beryllium compound and chromium material according to this invention is found to be especially advantageous in improving both the porosity and the hardness of the periclase obtained.

Example 2

With a portion of magnesium hydroxide filter cake prepared as described in Example 1, there are intimately admixed chromic acid in an amount to provide ⅛%, calculated as $Cr_2O_3$, in the fired product, and $AlCl_3.6H_2O$, to provide ⅛%, calculated as $Al_2O_3$, therein. The mixture is dried, pelleted and fired at 1700° C. for one-half hour, and the periclase obtained is very hard, exhibiting a conchoidal fracture and an apparent porosity of 11.2%. Another portion of the filter cake, treated in exactly the same way but with no addition of aluminum compound or chromium material, exhibits an apparent porosity of 13.0%, and forms a brittle, needle grain.

Example 3

With another portion of the magnesium hydroxide filter cake of Example 1 are admixed chromic acid in an amount to provide ⅛%, calculated as $Cr_2O_3$, in the fired product, and finely divided zirconia ($ZrO_2$), to provide ⅛%, calculated as $ZrO_2$, in the final product. The mixture is dried, pelleted and fired for one-half hour at 1700° C. The periclase obtained is a brittle, needle grain. It has an apparent porosity of 9.0%; in contrast to that of the blank, which as described in Example 1, has a porosity of 14.5%. The similar addition of ¼% zirconia alone gives a product having an apparent porosity of 14.0%; and, of chromic acid alone corresponding to ¼% $Cr_2O_3$, a product having an apparent porosity of 12.0%.

Example 4

With another portion of a magnesium hydroxide filter cake, prepared according to the method described in Example 1, are admixed chromic acid in an amount to provide ⅛%, calculated as $Cr_2O_3$, in the fired product, and $CoCl_2.6H_2O$, to provide ⅛, calculated as $Co_2O_3$, therein. This mixture is likewise dried, pelleted, and fired at 1700° C. for one-half hour. The periclase so obtained is hard and has a conchoidal fracture, and it exhibits an apparent porosity of 9.0%. Other portions of the same magnesium hydroxide treated in exactly the same way but with the addition of, in one case, ¼%, as $Co_2O_3$, of $CoCl_2.6H_2O$ as the only crystallizing additive and, in another case, with ¼%, as $Cr_2O_3$, of chromic acid alone, exhibit, respectively, upon such firing, a porosity of 13.5%, and of 12.0%.

Example 5

With 3.5 pounds of magnesium hydroxide filter cake obtained as described in Example 1, corresponding to 500 grams of MgO, are admixed 6.57 grams of $Cr(NO_3)_2.9H_2O$, 600 cc. of water, and 5.2 grams of $MnSO_4.H_2O$, the whole thoroughly blended, then dried, pressed and pelleted; and the pellets are fired for one-half hour at 1700° C. The additions shown provide, respectively, ¼% chromium, calculated as $Cr_2O_3$, and ½% manganese, calculated as $Mn_2O_3$, in the fired product. The periclase obtained upon firing is a brittle needle grain, having a porosity of 7.3%. Another portion of the filter cake treated in the same way but without any additive exhibits a porosity of 13.0%; and a further portion thereof likewise treated in the same way but with chromium nitrate, the only crystallizing component, added to give ¾% $Cr_2O_3$ upon firing, exhibits a porosity of 10.3%, yielding a hard grain. When the manganese salt is similarly added alone to provide ¾% $Mn_2O_3$ in the fired product, the grain is brittle and has a porosity of 12.0%.

In addition to the results demonstrated by the examples, the following table illustrates some effects obtained with other crystallizing components employed according to this invention. In these tests, at (a), the indicated component is admixed with precipitated magnesium hydroxide in an amount to provide ⅛%, calculated as the indicated oxide, on the fired basis; and there is also admixed therewith chromic acid in an amount to provide ⅛%, calculated as $Cr_2O_3$, on the fired basis. The $Mg(OH)_2$ in each case contained over 97% MgO and 1.25% $SiO_2$ on the ignited basis. At (b), another portion of the $Mg(OH)_2$ is mixed with chromic acid only, to give ¼%, as $Cr_2O_3$, on the fired basis; and at (c), no material is added to the magnesium hydroxide. In each test, the mixture or blank is dried, pelleted and fired for one-half hour at 1700° C.; except in the case of $MnSO_4.H_2O$, where the pelleted masses are fired at 1550° C. In the tests here tabulated, the improvement obtained when employing the combination of crystallizing components is greater than when employing either alone, either as to porosity or as to hardness and toughness (resistance to shock or impact). For instance, when the copper sulfate is added alone, similarly as in the above tests, to give ¼% CuO, the resultant porosity is 14.5%; and when manganese salt is added alone, to give ¾% $Mn_2O_3$, the porosity sometimes is very little below the blank, and the grain is brittle, but with manganese sulfate and chrome both added in a batch, porosity is greatly improved.

TABLE

| Component Added to Mg(OH)₂ | Amount, Calcined as Oxide | Porosity Percent |
|---|---|---|
| (a) $CuSO_4.5H_2O$ | ⅛% CuO / ⅛% $Cr_2O_3$ | 7.9 |
| (b) $CrO_3$ only | ¼% $Cr_2O_3$ | 9.0 |
| (c) Blank | | 13.5 |
| (a) $Zn(C_2H_3O_2)_2.2H_2O$ | ⅛% ZnO / ⅛% $Cr_2O_3$ | 7.9 |
| (b) $CrO_3$ only | ¼% $Cr_2O_3$ | 11.4 |
| (c) Blank | | 14.5 |
| (a) $Pb(C_2H_3O_2)_2.3H_2O$ | ⅛% $Pb_2O_3$ / ⅛% $Cr_2O_3$ | 6.8 |
| (b) $CrO_3$ only | ¼% $Cr_2O_3$ | 9.7 |
| (c) Blank | | 12.5 |
| (a) $VCl_4$ | ⅛% $V_2O_3$ / ⅛% $Cr_2O_3$ | 11.4 |
| (b) $CrO_3$ only | ¼% $Cr_2O_3$ | 10.3 |
| (c) Blank | | 13.0 |
| (a) $MnSO_4.H_2O$ | ⅛% $Mn_2O_3$ / ⅛% $Cr_2O_3$ | 9.5 |
| (b) $CrO_3$ only | ¼% $Cr_2O_3$ | 12.5 |
| (c) Blank | | 15.2 |

In place of adding the chromium constituent as chromic acid, other chromium compounds, as described above, can be employed. In a variation, chromite ore, soda ash or other alkali, and magnesium hydroxide or carbonate are admixed, suitably in equal parts, and calcined. There is thus provided a product suitable as an additive in the present process, because it contains sodium chromate, and an aluminum compound as well, along with some iron.

Apparent porosity is measured, in the present specification, by mercury displacement and upon a sample of sizes passing 6 mesh and retained on 10 mesh, employing vacuum to remove entrained air.

Some of the elements disclosed as useful in this invention often occur as impurities in magnesium hydroxide recovered from various natural sources. For instance, alumina and manganese oxide are generally present in the Mg(OH)₂ obtained as described in Example 1. It has been observed, and is demonstrated by the blanks of the various examples, that the beneficial results of the present method are not produced by these naturally occurring inclusions. It may be that the natural impurities are not properly distributed or that they are present in an inert form; but, in any case, a recitation, of the percentage of crystallizing component present or added is to be understood to mean that such percentage is the amount added by the method of the present invention, and does not necessarily include the oxide of the particular element which may be present as naturally occurring impurity.

Preferably, the magnesia starting material is of high purity; and it is preferred that it contain, on the ignited basis, at least 95.0% of magnesium oxide and not more than 2.0% of $SiO_2$.

It is a particular advantage of this invention that a well-crystallized high-purity magnesia grain can be obtained by firing at temperatures considerably lower than are required for firing magnesia of such purity without the added compounds. This invention enables firing such magnesia in a rotary kiln to obtain the desired crystallization, or at an equivalent temperature and for an equivalent time. If desired, the admixed substances, if in slurry form, can be introduced directly into the rotary kiln, and dried and fired in one operation.

The manner in which the invention functions to bring about better development of the crystallization of high-purity magnesias at lower firing temperatures is not completely understood, and, therefore, it is desired to be not limited by the following discussion of one theory of the operation.

When the magnesia-yielding materials, particularly precipitated substances which, upon heating or firing, yield magnesia containing less than 2% $SiO_2$, and less than 2% CaO, or cryptocrystalline magnesia of the same purity, are so heated as to form magnesia in crystalline form, very little coalescence or crystal growth occurs and the magnesia crystals obtained are still very finely divided and of extensive surface. As stated hereinabove, electric fusion serves to form larger crystals but at high cost, and the addition of fluxing ingredients introduces substantial amounts of impurities which alter the physical and chemical characteristics of the product. It is apparent that the addition of a substance of the class described does not act in the manner of a fluxing agent because the optimum amounts employed are too small, increasing amounts yield higher porosities, and, furthermore, increasing amounts of other impurities which normally act as fluxing agents tend to hinder the mineralizing action of the added substance. These considerations are contrary to the operation of the commonly used fluxing materials. The effect of adding the substance as described is evidently not to cause fusion or sintering because the effect is apparently greater on higher purity material. The phenomenon is considered to be a catalytic or mineralizing effect because it has been observed that the small additions of the substances noted initiate crystallization of magnesia at lower temperatures, mature the crystallization more rapidly, and produce better crystallization than is obtained with the untreated magnesia. This invention enables the production of well-crystallized periclase by firing under conditions usually attainable in the rotary kiln, that is, at temperatures not over about 1800° C. and for periods not exceeding about an hour. The product, because of its dense structure, high purity, low residual shrinkage, and toughness, is desirable for use in a number of fields. It is highly useful, for instance, for refractories, heat-exchange media and abrasives.

In this specification and claims porosity where expressed is in percentage by volume and other percentages and parts are by weight.

In conformity with common practice in reporting chemical analyses of refractory materials, in the specification and claims the proportions of the various chemical constituents present in a material are given as though these constituents were present as the simple oxides. Thus, the magnesium constituent is referred to as magnesium oxide or MgO, the chromium constituent as $Cr_2O_3$, the silicon constituent as $SiO_2$, and so on for other elements reported, although the silica or chromium oxide and a very small proportion of the MgO, for example, may be present in combination with each other or with another minor constituent. For example, the term "1.0% by weight of chromium as, or calculated as $Cr_2O_3$" is intended to mean that a chemical analysis of the material referred to would show the chromium content as 1.0% expressed as $Cr_2O_3$, although in reality all of the chromium might be present in the form of magnesium chromite or in some other combined form.

The term "magnesium compound which will yield periclase upon firing," or "magnesia-yielding" or "periclase-yielding compound" is intended to include cryptocrystalline magnesia, or amorphous magnesia, as well as magnesium compounds such as magnesium hydroxide, magnesium carbonate or basic carbonate, magnesium alcoholate, magnesium acetate and the like which upon firing yield magnesia or periclase. The dispersing of the added compounds in the liquid is intended to include the employment of a solution of the compounds and also of a colloidal suspension thereof. The term "crystallizing component" is employed for convenience in referring to chromium material and a compound of any of the elements disclosed as having, in combination with the chromium material, a favorable effect upon the crystallization of the magnesia. Mixtures of the chromium materials noted can be added. Where solid substances are admixed in this invention, they are in finely divided state, preferably passing through a 200 mesh screen, or are suspended in a tempering liquid. If desired the chromium material and the secondary crystallization-promoting component can be previously chemically combined, and can be employed in the present process in the form of a compound, such as, for example, zinc chromate or dichromate, copper chromate, etc. It is to be understood that the amount of chromium material component or of secondary crystallization-promoting component shown can be varied as desired, within the limits described but including both components, in accordance with varying characteristics of the starting magnesia material. It may be desirable to use a greater or lesser amount of either component to obtain optimum results according to the invention. The screen sizes given herein are those of United States Bureau of Standards screens. The fired oxides are calculated as sesquioxides, $R_2O_3$, except for BeO, CuO, and ZnO, which are calculated as these oxides, and zirconium oxide which is herein expressed as $ZrO_2$.

Having now described the invention, what is claimed is:

1. A process for preparing dense periclase refractory material which comprises intimately admixing a finely divided periclase-forming magnesium compound containing at least 95.0% MgO and not over 2.0% of $SiO_2$ on the ignited basis, chromium material as a crystallization promoter, and at least one secondary crystallization promoting metal compound adapted to form a refractory multiple oxide upon firing, said metal being selected from the group consisting of aluminum, beryllium, cobalt, lead, copper, manganese, nickel, vanadium, zinc and zirconium, said metal compound being added to provide a minimum amount on the order of about $\frac{1}{16}\%$, said chromium material and said metal compound being added in total amount up to about 2.0%, said amounts being based on the total weight of the fired product and calculated as the oxides, and firing said admixture to form a well-crystallized periclase.

2. Process as in claim 1 wherein said magnesium compound is a precipitated magnesium compound.

3. Process as in claim 1 wherein there is added chromic acid.

4. Process as in claim 1 wherein there is added as secondary crystallization component an aluminum compound.

5. Process as in claim 1 wherein there is added as secondary crystallization component a beryllium compound.

6. Process as in claim 1 wherein there is added as secondary crystallization component a zirconium compound.

7. Process as in claim 1 wherein said chromium material is added as a dispersion in water.

8. Process as in claim 1 wherein said secondary crystallization component is added as a dispersion in water.

9. Process as in claim 1 wherein said admixture is fired at a temperature of from 1500° C. to 1800° C.

10. A process for preparing dense periclase refractory material which comprises intimately admixing a finely divided periclase-forming magnesium compound containing at least 95.0% MgO and not over 2.0% of $SiO_2$ on the ignited basis, chromium material as a crystallization promoter, and at least one secondary crystallization promoting metal compound adapted to form a refractory multiple oxide upon firing, said metal being selected from the group consisting of aluminum, beryllium, cobalt, lead, copper, manganese, nickel, vanadium, zinc and zirconium, said metal compound being added to provide a minimum amount on the order of about $\frac{1}{16}\%$, said chromium material and said metal compound being added in total amount up to about 2.0%, said amounts being based on the total weight of the fired product and calculated as the oxides, pressing said admixture, and firing said admixture to form a well-crystallized periclase.

11. Process as in claim 10 wherein said finely divided magnesium compound is a precipitated magnesium compound.

12. Process as in claim 10 wherein said secondary crystallization-promoting substance is an aluminum compound.

13. Process as in claim 10 wherein said secondary crystallization-promoting substance is a beryllium compound.

14. Process as in claim 10 wherein said secondary crystallization-promoting substance is a zirconium compound.

15. Process as in claim 10 wherein said pressed admixture is fired at a temperature of from 1500° C. to 1800° C.

16. Process for preparing dense periclase refractory material which comprises intimately admixing precipitated magnesium hydroxide, containing on the ignited basis at least 95.0% magnesium oxide and less than 2.0% silica, a water-soluble chromium compound in an amount to provide from $\frac{1}{16}\%$ chromium, calculated as $Cr_2O_3$, based on the total weight of the fired product, and a water-soluble aluminum compound in an amount to provide from $\frac{1}{16}\%$ aluminum, calculated as $Al_2O_3$, based on the total weight of the fired product, the total amount of said chromium and said aluminum compounds providing up to 2.0% total of said oxides as calculated, pressing and firing to form well-crystallized periclase.

17. Process for preparing dense periclase refractory material of increased hardness which comprises intimately admixing precipitated magnesium hydroxide, containing on the ignited basis at least 95.0% magnesium oxide and less than 2.0% silica, a water-soluble chromium compound in an amount to provide from $\frac{1}{16}\%$ chromium, calculated as $Cr_2O_3$ based on the total weight of the fired product, and a water-soluble beryllium compound in an amount to provide from $\frac{1}{16}\%$ beryllium, calculated as BeO based on the total weight of the fired product, the total amount of said chromium and said beryllium compounds providing up to 2.0% total of said oxides as calculated, pressing said admixture and firing to form well-crystallized periclase.

18. Process for preparing dense periclase refractory material which comprises intimately admixing precipitated magnesium hydroxide, containing on the ignited basis at least 95.0% magnesium oxide and less than 2.0% silica, a water-soluble chromium compound in an amount to provide from $\frac{1}{16}\%$ chromium, calculated as $Cr_2O_3$ based on the total weight of the fired product, and finely divided zirconia in an amount to provide from $\frac{1}{16}\%$ of zirconium, calculated as $ZrO_2$, based on the total weight of the fired product, the total amount of said chromium compound and said zirconia providing up to 2.0% total of said oxides as calculated, pressing said admixture and firing to form well-crystallized periclase.

19. In the process of preparing well-crystallized periclase, the steps which comprise pressing an intimate admixture of cryptocrystalline magnesia containing at least 95.0% MgO and not over 2.0% of $SiO_2$ on the ignited basis, chromium material as a crystallization promoter, and at least one secondary crystallization promoting metal compound adapted to form a refractory multiple oxide upon firing, said metal being selected from the group consisting of aluminum, beryllium, cobalt, lead, copper, manganese, nickel, vanadium, zinc and zirconium, said metal compound being added to provide a minimum amount on the order of about $\frac{1}{16}\%$, said chromium material and said metal compound being added in total amount up to about 2.0%, said amounts being based on the total weight of the fired product and calculated as the oxides, and firing said pressed admixture at a temperature of at least 1300° C. to form well-crystallized periclase.

20. Process as in claim 19 wherein said admixture is fired at 1700° C.

21. A process according to claim 19 wherein the chromium material is added to provide a minimum amount on the order of about $\frac{1}{16}$% chromium, calculated as $Cr_2O_3$ based on the total weight of the fired product.

LESLIE W. AUSTIN.
CLARENCE A. RICK.

References Cited in the file of this patent

UNITED STATES PATENTS

| Number | Name | Date |
|---|---|---|
| 2,053,369 | Jeffery | Sept. 8, 1936 |
| 2,313,746 | Heany | Mar. 16, 1943 |
| 2,487,290 | Austin et al. | Nov. 8, 1949 |
| 2,487,497 | Vettel | Nov. 8, 1949 |